United States Patent
Tennant et al.

[11] Patent Number: 5,251,064
[45] Date of Patent: Oct. 5, 1993

[54] LIGHTING FIXTURE REFLECTOR CONTAINING ULTRAVIOLET ABSORBER

[75] Inventors: R. Alexander Tennant, Santa Clara; Thomas G. Hood, San Francisco, both of Calif.

[73] Assignee: Southwall Technologies Inc., Palo Alto, Calif.

[21] Appl. No.: 665,841

[22] Filed: Mar. 8, 1991

[51] Int. Cl.⁵ ............ G02B 5/08; G02B 5/20; F21V 7/22; B32B 15/08
[52] U.S. Cl. .................... 359/361; 359/350; 359/884; 359/885; 428/458; 428/463; 362/307; 362/341; 362/296
[58] Field of Search ............ 359/350, 361, 883, 884, 359/885, 359, 360, 838; 428/458, 463; 362/260, 296, 307, 311, 341, 343, 347

[56] References Cited

U.S. PATENT DOCUMENTS

| | | | |
|---|---|---|---|
| 4,230,763 | 10/1980 | Skolnick | 428/458 |
| 4,307,150 | 12/1981 | Roche | 428/336 |
| 4,446,262 | 5/1984 | Okumura et al. | 524/89 |
| 4,645,714 | 2/1987 | Roche et al. | 359/884 |
| 4,666,263 | 5/1987 | Petcavich | 359/883 |
| 4,933,823 | 6/1990 | Taylor | 359/884 |
| 5,118,540 | 6/1992 | Hutchison | 428/463 |

Primary Examiner—Bruce Y. Arnold
Assistant Examiner—David R. Parsons
Attorney, Agent, or Firm—Morrison & Foerster

[57] ABSTRACT

Reflective, metalized plastic films for use in lighting fixture reflectors have improved performance when the plastic film upon which the metalization layer is deposited contains ultraviolet absorber.

14 Claims, 1 Drawing Sheet

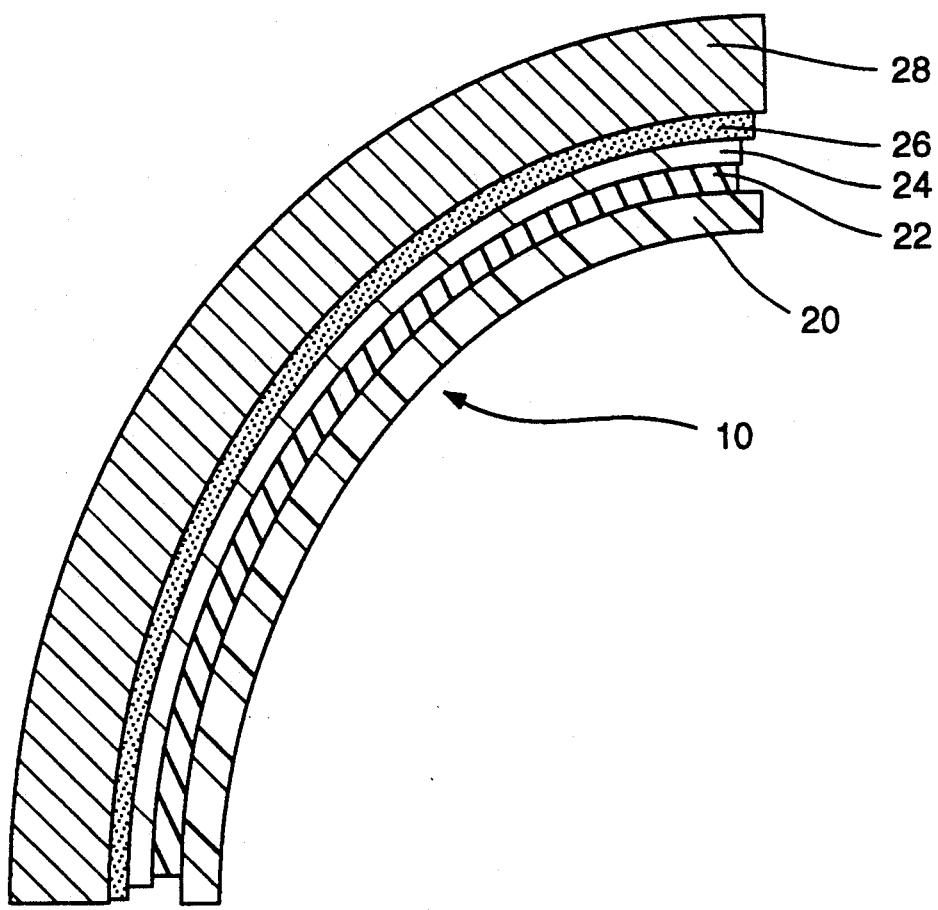

LIGHTING FIXTURE REFLECTOR CONTAINING ULTRAVIOLET ABSORBER

BACKGROUND OF THE INVENTION

1. Field of the Invention

This invention relates to an improved lighting fixture reflector. More particularly, it relates to an improvement in lighting fixture reflectors which employ a sheet of metalized plastic as the reflecting element.

2. Background Art

Many types of lighting fixtures employ a reflector behind the light source to beam the light in a desired direction. One approach to forming these reflectors is to employ a sheet of metal which has been highly polished. Another approach is to use a sheet of metal which has been plated. A third approach is exemplified in U.S. Pat. No. 4,307,150 of Roche, which discloses using as a reflector a polymeric sheet upon which has been deposited a layer of evaporated metal. This polymeric sheet is then bonded to a suitable rigid support. Another reference which relates to this type of polymer sheet-based reflector is U.S. Pat. No. 4,666,263 of Petcavich, which describes a particular type of metalized coating made up of silver and a stainless steel or other corrosion-resistant metal protecting layer. For the past several years, Southwall Technologies Inc., of Palo Alto, Calif., and Deposition Technology, Inc., of San Diego, Calif., have marketed metalized plastic sheet materials for use in reflectors. These materials have been based on a poly(ethylene terephthalate) film with silver as the metal layer. These materials can also include an adhesive layer on the silver for gluing the film to the rigid support. In the Southwall product in the past, the plastic film employed has been conventional poly(ethylene terephthalate), such as du Pont's MYLAR. While this material has been very advantageous in offering a smooth surface, a high degree of transparency and resistance to many environmental agents, such as water and/or oxygen, the overall life of the metalized films has been less than optimal because of delamination of the silver from the polymer or discoloration of the silver film over extended periods of time.

Since the delamination and the discoloration directly reduce the efficiency of the reflector, they are serious problems. Any improvement which could be made so as to extend the useful life of the film and the reflectors made from it would be valuable.

STATEMENT OF THE INVENTION

It has now been found that the problems of reflector film delamination and reflector film discoloration over time are caused by ultraviolet radiation degrading the bond between the plastic sheet and the silver layer. It has been further found that this problem may be solved by employing as plastic sheet a polyester sheet which contains an ultraviolet absorber.

Thus, in one embodiment this invention provides a metalized reflector film for use in lighting fixtures. This reflector film comprises a sheet of flexible plastic carrying a vacuum-deposited layer of reflective metal. In this reflective film, the improvement involves employing as the flexible plastic a plastic containing an effective ultraviolet stabilizing concentration of ultraviolet absorber.

In another embodiment, this invention relates to a light fixture reflector which is made of a rigid substrate with a sheet of metalized plastic reflector film attached thereto. In this embodiment, the improvement involves employing as the reflector film, a reflector film which contains an ultraviolet absorber in its plastic sheet.

BRIEF DESCRIPTION OF THE DRAWING

This invention will be described with reference to the accompanying drawing in which the sole FIGURE is a cross-sectional view of a reflector of this invention.

DETAILED DESCRIPTION OF THE INVENTION

In accord with the present invention, the performance of metalized plastic reflector films used in lighting fixture reflectors is improved. This is done by incorporating an ultraviolet absorber into the plastic component of the film. The presence of this ultraviolet absorber leads to improved bonding between the plastic film and the metal layer, and thus prevents degradation of the performance of the reflective layer.

The Metalizing Layer

The reflector films which are improved in accord with this invention contain a metalizing film. This is a thin layer (typically 50-1000 Å thick) of a reflective metal. Silver is the most preferred metal, but aluminum can also be used, if desired. This metal layer is laid down by a vacuum deposition method. This can include evaporation methods, but preferably is done by sputtering, either magnetron or radio frequency sputtering. These processes are well known, as is there use to apply metal layers onto plastic sheets.

The Plastic Sheet

The metalized reflector film of this invention includes a plastic sheet. This plastic sheet is made of a flexible plastic which is transparent and exhibits resistance to water and oxygen. Any material meeting these criteria may be used. However, commercially available polyesters have been widely used as substrates for thin metal layers and are preferred. These polyesters may be aromatic polyesters such as poly(ethylene terephthalate), poly(tetramethylene terephthalate), and poly(ethylene 2,6-naphthalate). These materials are derived from an acid component composed mainly of terephthalic acid, isophthalic acid or naphthalenedicarboxylic acid and a glycol component composed mainly of ethylene glycol or tetramethylene glycol. Of these polyesters, poly(ethylene terephthalate) is preferred, primarily because of its wide commercial acceptability and availability. The plastic film ranges in thickness from about 0.4 mils to about 10 mils. Preferred thicknesses are from about 0.5 mils to about 5 mils, with thicknesses from about 0.5 mils to about 3 mils being most preferred.

The UV Absorbers

In accord with this invention, an ultraviolet absorber is present in the plastic film. Known ultraviolet absorbers in the art may be used for this purpose. One group of ultraviolet absorbers which have proven advantageous are those disclosed in Teijin Ltd.'s, U.S. Pat. No. 4,446,262. This patent is incorporated by reference. These materials are cyclic imino esters having an aromatic nucleus. In these materials, two carbon atoms of the aromatic nucleus form a part of the imino ester ring, such as 2,2'-p-phenylene-bis(3,1-benzoxazin-4-one) or 2,8-dimethyl-4H,6H-benzo(1,2-d:5,4-d')bis-(1,3)-oxazene-4,6-dione in the unreacted state. These materials may be further characterized by being cyclic imino esters of the following formula (I)

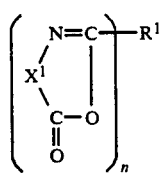

In this formula $X^1$ represents a divalent aromatic residue in which the two bonds from $X^1$ are at the 1- and 2-positions; n is 1, 2 or 3; and $R^1$ represents a hydrocarbon residue having a valence of n which may further contain a hetero atom, or $R^1$ may be a direct bond when n is 2. Other useful materials include the cyclic imino esters of the following formula (II)

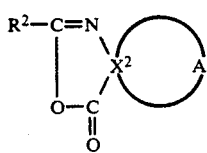

wherein A represents a group of the following formula (II)-a

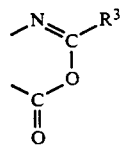

or a group of the following formula (II)-b

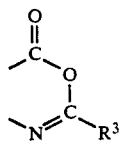

$R^2$ and $R^3$ are identical or different and each represents a monovalent hydrocarbon residue; and $X^2$ represents a tetravalent aromatic residue which may further contain a hetero atom, in the unreacted state.

The compounds of formula (I) are preferred, especially preferably the compounds of formula (I) in which n is 2, and more preferably compounds of the following formula (I)-1

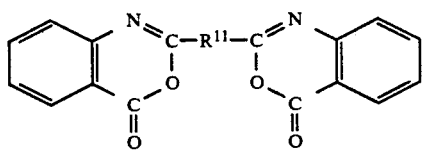

wherein $R^{11}$ represents a divalent aromatic hydrocarbon residue.

Among the compounds of formula (I)-1, 2,2'-(4,4'-p-phenylene-bis(3,1-benzoxazin-4-one), 2,2'-diphenylene)-bis(3,1-benzoxazin-4-one), and 2,2'-(2,6-naphthalene)-bis(3,1-benzoxazin-4-one) are especially preferred.

The addition of the ultraviolet absorber to the plastic can be carried out by physically incorporating the absorber into the plastic prior to forming the desired sheet. This can be done by simple admixing prior to the casting and drawing of the sheet. The amount of ultraviolet absorber admixed into the plastic sheet material ranges from about 0.05 parts to about 5 parts by weight per hundred parts by weight of the sheet-forming polymer. Preferred use levels range from about 0.1 parts by weight to about 3 parts by weight of absorber per hundred parts by weight of polymer.

The Reflector Structure

The reflectors provided by this invention generally include a stiff physical support such as a metal sheet, rigid plastic sheet, or the like. The purpose of this backing is to give a physical shape to the reflector. This physical shape is designed to serve as a high efficiency reflector in a lighting fixture environment.

In one embodiment, the reflector structure is first formed as a flat sheet including the metalized plastic sheet, and this is then formed into the desired filter shape. Alternatively, the backing material can be shaped into the configuration needed for the reflector, and then the metalized plastic film containing the ultraviolet absorber in accordance with this invention can be affixed to it. In either case, the overall configuration of the structure is that of a laminate of the stiff backing element, a layer of adhesive, optionally an overcoat or hard coat of the like, the metal layer, then the ultraviolet absorber-containing plastic sheet, and finally an optional protective hard coat layer. In this configuration, the ultraviolet absorber-containing plastic sheet is between the light source and the metal layer and thus serves to shield the metal layer/plastic sheet interface.

The invention will be further described with reference being made to the following example. This example is provided to illustrate a preferred embodiment of the invention, but is not proposed to limit the scope of this invention, which is instead defined by the appended claims.

EXAMPLE

A reflector 10 of the invention is prepared as shown in the drawing. A sheet of poly(ethylene terephthalate) 20 is obtained from Teijin Ltd., under their product identification B43-100G. This sheet 20 is 1.0 mils thick and contains from 0.05 to 5% by weight of a cyclic imins ester ultraviolet absorber. This absorber is of the type shown in U. S. Pat. No. 4,446,262. This plastic sheet material can be further characterized by the following key properties:
Haze =0.4%
Total visible light transmission =88.2%
U. V. absorption
@360 nm =100%
@370 nm =99%
@380 nm =90%

This sheet is subjected to D. C. magnetron sputtering using argon gas and a silver cathode. The speed at which the sheet is moved past the cathode and other parameters are controlled to lay down a silver layer 22 having a thickness of 800 to 1200 Å. This is followed directly by sputter deposition of a nichrome layer 24 50–150 Å thickness for improved corrosion resistance and ease of handling. This material is then removed from, the sputterer and a layer of pressure-sensitive adhesive 26 applied over the nichrome layer, followed by a release liner. In a separate operation, the release liner is removed and the silver-coated film is affixed to a backing surface 28 such as sheet steel, sheet aluminum or sheet plastic, and then shaped into a configuration suitable for serving as a fluorescent light fixture reflector 10.

For purposes of comparison, the same product is produced, but using a polyester of the art not containing the ultraviolet absorber. When these materials are subjected to a prolonged, intense light exposure, it is seen that the material of the prior art undergoes degradation in appearance and therefore in performance. In contrast, the material of this invention containing the ultraviolet absorber exhibits significantly enhanced stability.

What is claimed is:

1. In a metalized reflector film comprising a sheet of flexible plastic carrying a vacuum-deposited layer of reflective silver metal, the improvement comprising employing as the flexible plastic a plastic containing an effective silver-to-plastic bond degradation-preventing concentration of ultraviolet absorber.

2. The reflector film of claim 1 wherein the flexible plastic is polyester.

3. The reflector film of claim 2 wherein the polyester is poly(ethylene terephthalate).

4. In a lighting fixture reflector made up of a rigid substrate with a sheet of metalized plastic reflector film attached thereto, the improvement comprising employing as said film, the film of claim 3.

5. The reflector film of claim 2 wherein the ultraviolet absorber is a cyclic imino ester having an aromatic nucleus.

6. The reflector film of claim 5 wherein the ultraviolet absorber has the formula

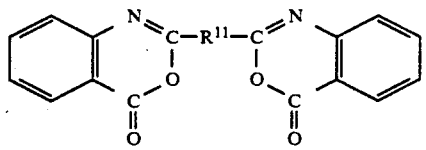

wherein $R^{11}$ represents a divalent aromatic hydrocarbon residue.

7. The reflector film of claim 6 wherein the effective concentration is from about 0.05 to 5 parts by weight of absorber per hundred parts by weight of plastic.

8. In a lighting fixture reflector made up of a rigid substrate with a sheet of metalized plastic reflector film attached thereto, the improvement comprising employing as said film, the film of claim 7.

9. The reflector film of claim 6 wherein the silver metal is sputter deposited.

10. In a lighting fixture reflector made up of a rigid substrate with a sheet of metalized plastic reflector film attached thereto, the improvement comprising employing as said film, the film of claim 9.

11. In a lighting fixture reflector made up of a rigid substrate with a sheet of metalized plastic reflector film attached thereto, the improvement comprising employing as said film, the film of claim 6.

12. In a lighting fixture reflector made up of a rigid substrate with a sheet of metalized plastic reflector film attached thereto, the improvement comprising employing as said film, the film of claim 5.

13. In a lighting fixture reflector made up of a rigid substrate with a sheet of metalized plastic reflector film attached thereto, the improvement comprising employing as said film, the film of claim 2.

14. In a lighting fixture reflector made up of a rigid substrate with a sheet of metalized plastic reflector film attached thereto, the improvement comprising employing as said film, the film of claim 1.

* * * * *